Dec. 2, 1952          C. W. BERTHIEZ          2,620,462

DEVICE FOR CONTROLLING THE SPEED OF A LEONARD GROUP

Filed Jan. 24, 1950          2 SHEETS—SHEET 1

INVENTOR
Charles William Berthiez
By
George H[illegible]
ATTORNEY

Dec. 2, 1952          C. W. BERTHIEZ          2,620,462
DEVICE FOR CONTROLLING THE SPEED OF A LEONARD GROUP
Filed Jan. 24, 1950          2 SHEETS—SHEET 2
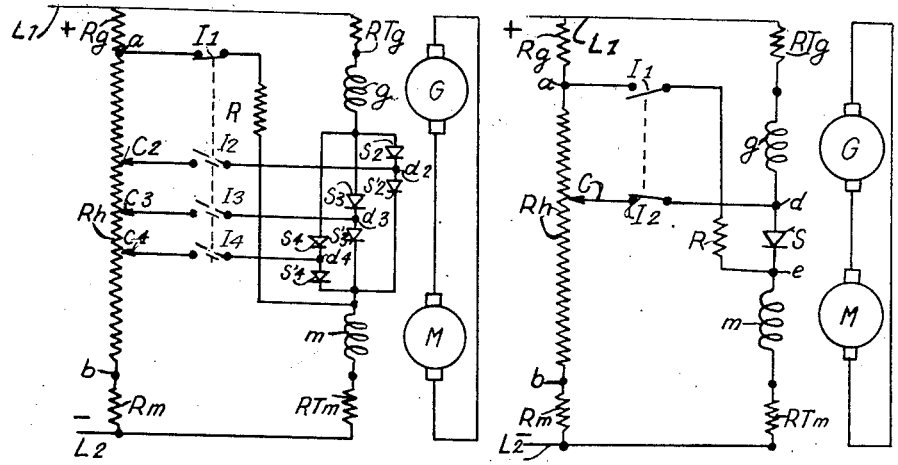
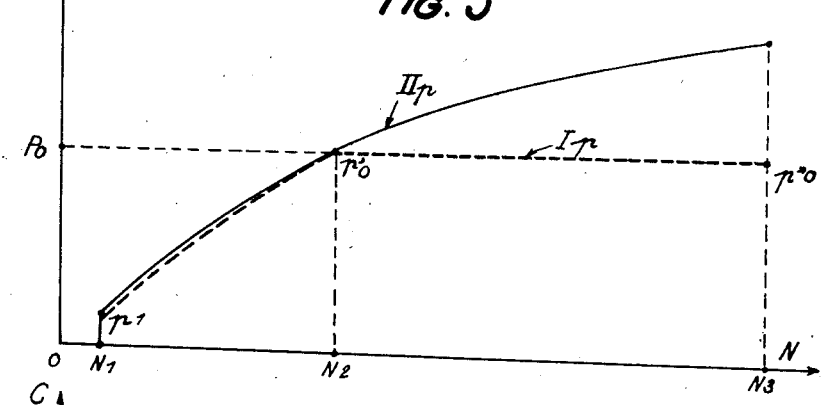
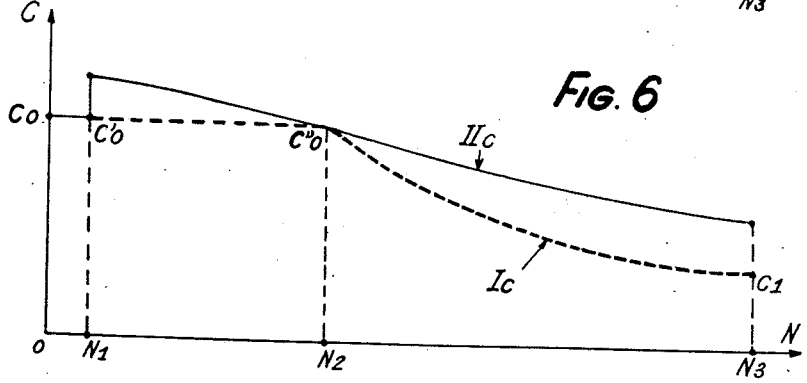
INVENTOR
Charles William Berthiez
By George Hadley
ATTORNEY Patented Dec. 2, 1952

2,620,462

UNITED STATES PATENT OFFICE 2,620,462

DEVICE FOR CONTROLLING THE SPEED OF A LEONARD GROUP

Charles William Berthiez, Paris, France

Application January 24, 1950, Serial No. 140,221
In France February 17, 1949

18 Claims. (Cl. 318—154)

Standard Leonard groups comprise, as is well known, a D. C. load motor the speed of which may be varied by adjusting the voltage of the generator which feeds this motor. In order to increase the range of speeds of the motor it is common practice to act also upon the field winding of the motor. In this case, the electric equipment for controlling the motor speed comprises a pair of rheostats, one for regulating the generator field and the other for regulating the motor field. In most cases both rheostats are mechanically connected and operate electrically in succession. Under these conditions, the load motor of the group operates under constant torque conditions in the lower portion of the speed range and subsequently under constant power conditions in the other or upper portion of the speed range. The motor will therefore undergo a sudden change of mechanical operating characteristics at a given value of the speed range, which is not in keeping with any particular mechanical requirement. In fact, it would be preferable if the motor had continuous operating characteristics throughout.

In addition, the rheostats employed for the purpose specified above may be either of the stud type or the slider type, the latter having a slider which is caused to travel in frictional engagement with wire wound on insulating tubular cores.

The double rheostats of the former type lead to a rather intricate mechanical construction and, due to the provision of studs, the resistances of the field circuits and also the speed values are varied through successive steps. When rheostats of the slider type are employed a continuous resistance variation is obtained. However they require a given number of wire sizes in order to make allowance for the different strengths of the currents flowing therethrough, and this becomes a source of constructional difficulties. Moreover, the thinnest wire cross-sections are particularly fragile, which may be a cause of failure for the whole equipment.

To overcome the above described drawbacks, it has also been proposed to use a single-rheostat controlling device which makes it possible to obtain a continuous variation of speed of the motor under variable torque and power conditions throughout the entire speed range thereof. In addition, the resistance wire is of a constant and relatively large cross-section or thickness on the entire length of the rheostat.

According to this arrangement, the field coils of the generator and of the load motor of the Leonard group are connected in series to the end terminals of a resistor connected across the wires of a line feeding said field windings, the slider terminal being connected to the common terminal of said field windings.

However, under these conditions, for a given setting of the resistor slider, the motor will be started with a reduced field excitation, which condition is not to be recommended.

It is an object of the present invention to overcome this drawback.

Another object of the invention is to provide for a minimum excitation current in the generator and motor field windings when the slider of the resistor is set at the ends of its travel.

According to another object of the invention the resistor is provided with several sliders to allow several different predetermined settings of the motor speed, a safety device being included to avoid short circuits should several slider switches be simultaneously closed.

Other characteristics and advantages of the invention will appear in the course of the description to follow with reference to the accompanying drawings which show diagrammatically and solely by way of examples some embodiments of the invention.

In the drawings:

Figs. 2 to 4 are diagrammatical illustrations of three embodiments of the invention;

Figs. 5 and 6 are diagrams showing the operating characteristic curves of the load motor of a Leonard group according to the known practice, and Fig. 7 is another wiring diagram of a modified embodiment of the invention wherein a resistor having several sliders is used.

Figure 1:
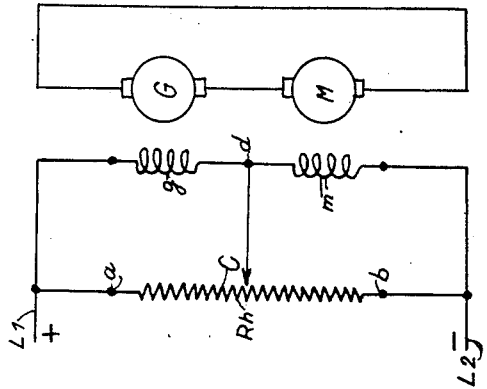
Fig. 1 is the wiring diagram of a known device for controlling a Leonard group.

Referring to Fig. 1, it will be first described a control device of a known type in view of facilitating further understanding of the features of the invention. On this figure, it will be seen that the generator and motor of the Leonard group are shown very diagrammatically. The armature windings and the separately energized field windings of the generator are shown at G and $g$ in this figure, respectively, while the armature windings and the separately energized field windings of the load motor are designated at M and $m$. This figure shows a simplified representation of the Leonard group, since the motor driving the group, the exciter or exciters, the braking devices and possibly the devices for reversing the direction of rotation of the motor M, the wiring connections of the automatic control equipment with the switching means pertaining thereto, which are usually employed, are not represented. The drawings show only those parts which are necessary for a clear understanding of the controlling device. But it will be readily apparent to those skilled in the art that this device may be used for controlling any Leonard group completed and improved according to the latest trends in the field concerned.

The field windings $g$ of the generator and $m$ of the motor are connected in series to the terminals of a direct current supply the two line wires of which are indicated at $L1$ for the positive and $L2$ for the negative lead, respectively. This supply may be provided, for example, by an exciter of the group or by any other suitable source of direct current. A resistor $Rh$ is connected at its end terminals $a$ and $b$ to the negative and positive terminals, respectively, of the supply $L1$—$L2$. Its slider C is connected to the common terminal $d$ of both field windings $g$ and $m$ of the generator and motor, respectively.

The arrangement just described operates as follows:

When the resistor slider C registers with the terminal $a$, the generator field coil $g$ is short-circuited and the motor field coil $m$ is connected directly across the supply $L1$—$L2$, whereby full field energization is applied to the motor M. Thus, if the generator of the group is driven at its rated speed, as its field winding is short-circuited, no voltage builds up in the generator so that the motor M will remain still. By causing the slider C to travel along the resistor $Rh$ toward the other end $b$ of the wound resistance thereof, an increasing current will be caused to flow through the field coil $g$ of the generator, and this current at the output end of the coil $g$ will be divided into two portions, one portion flowing through the field winding $m$ of the motor and the other through the resistance portion $Cb$ of the resistor. When the generator voltage reaches a sufficient value, the motor M will start under field conditions very close to maximum field conditions. As the slider C is brought nearer to the end $b$ of the resistor, the strength of the current flowing through the generator field winding $g$ increases while the strength of the current flowing through the motor field winding $m$ is reduced. In other words, the voltage of the generator G increases while the field of the motor M is reduced, thus progressively increasing the speed of this motor. It will be therefore apparent that for each position of the slider C there will be a given rated speed of the motor M.

Figs. 5 and 6 show diagram curves $IIp$ and $IIc$ of the power and torque, respectively, in terms of the speed, in a group of the type shown in Fig. 1.

In most conventional systems the speed of the load motor of Leonard groups is increased firstly by raising the voltage of the generator which feeds this motor so that in the first portion of the speed range $N1$—$N2$ (in abscissae in both Figs. 5, 6) the motor operates under constant torque conditions (see dotted line $C'o$—$C''o$ in Fig. 6), i. e. its power P (in ordinate in Fig. 5) is proportional to its speed N (see dotted line $pl$—$p'o$ in Fig. 5). Then, if it is desired to further increase the speed of the motor its field will be progressively reduced while its supply voltage is maintained at a constant value. In this second portion of the speed range ($N2$—$N3$) the motor operates at the constant power value $Po$ (see dotted line $p'o$—$p''o$, Fig. 5), i. e. its torque will be reduced as its speed increases (see dotted line $C''o$—$Cl$, Fig. 6). The curve $Ip$ of the power variations of a load motor in a Leonard group plotted against its speed has the shape of a broken line $pl$—$p'o$—$p''o$, Fig. 5), while the curve $Ic$ of the torque variations has the shape of broken line $C'o$—$C''o$—$Cl$ (Fig. 6).

It will be noted that with the arrangement shown in Fig. 1, since the generator field is increased permanently and continuously while the motor field is reduced and vice versa, the operating characteristics of the motor will be represented by means of continuous curves such as $IIp$ shown in thick line, Fig. 5, for the power characteristic, and $IIc$, also in thick line, Fig. 6, for the torque characteristic.

However with said known arrangement, if it is desired to start the motor when the resistor slider C is in the position indicated in Fig. 1, the starting would not occur under full field conditions, which is a drawback.

To obviate this difficulty, it would be necessary at the moment of the starting, to reset the motor under full field conditions by temporarily connecting terminal $d$ to terminal $a$. But then the generator field winding $g$ would be short-circuited and the generator could not supply any voltage to the motor, thus preventing the motor from starting.

On the other hand if the slider C were brought to the $b$ end of the resistor, the field winding $m$ of the motor would be completely short-circuited and the motor field would be almost reduced to zero and limited to the residual magnetism. Then the motor would run at too fast a speed, which is also undesirable.

To solve this problem, according to the invention, means are provided for ensuring predetermined minimum motor and generator excitations respectively when the slider is set at one end of its travel or at the other respectively.

Figure 2:
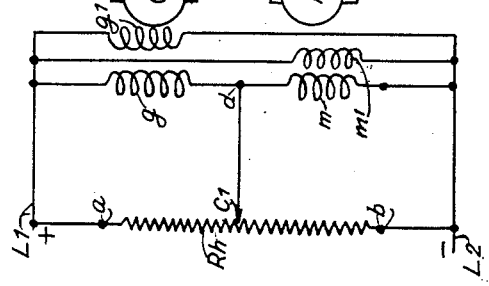

In Fig. 2, it has been shown one embodiment of the invention provided with such means.

In this figure the same elements having the same reference characters as in Fig. 1 are shown, except that means constituted by auxiliary field winds $gl$ and $ml$ have been added to the generator and to the motor, respectively, in order to ensure a constant minimum of field ampere-turns in each of these two machines. In the drawing, the auxiliary field windings are connected to the terminals of the same supply line $L1$—$L2$ as the main field windings $g$ and $m$, but it will be readily apparent to those skilled in the art that any other source of energy may be used, provided that suitable constant current flows through the independent field windings $gl$ and $ml$.

The operation of this arrangement is similar to that of Fig. 1. It will be noted however that when the slider is positioned at the $a$ end of the resistor, the motor will operate under full field conditions while the generator field is at its minimum value produced by its auxiliary field winding $gl$. Under these conditions the motor may be started in the proper manner.

On the other hand, when the slider C is positioned at the opposite end $b$ of the resistor, the generator field reaches its maximum value and the motor field is at the minimum value produced by the auxiliary field winding $ml$ of the motor in order to ensure the maximum desired speed of the motor without racing it, which would result if the conventional arrangement shown in Fig. 1 were used.

Figure 3:
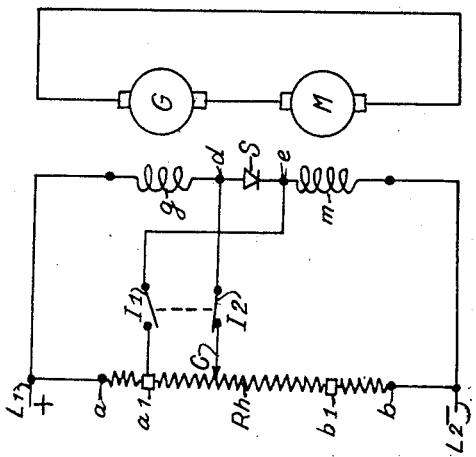

Another modified embodiment of the arrangement of Fig. 1 is shown in Fig. 3 where the same reference characters are used to designate similar parts. In Fig. 3, the means for ensuring predetermined minimum motor and generator excitations respectively when the slider is set at one end of its travel or at the other respectively are constituted by suitable abutments or stops $a_1$ and $b_1$ near the ends of the potentiometer for limiting the length of travel of the slider.

The arrangement of Fig. 3 comprises also a connection between the end $e$ of the motor winding $m$ and the point $a_1$ adjacent to the point $a$ on the resistor, a switch $I_1$ being interposed therebetween. Another switch $I_2$ is also interposed in the connection C—$d$ and a rectifier or unidirectional conducting element S is provided between the end $d$ of the generator field winding $g$ and the end $e$ of the motor field winding $m$. This rectifier S is connected so that the current will flow only in the $d$—$e$ direction.

The slider C does not engage either the $a_1$—$a$ portion or the $b_1$—$b$ portion of the resistor $Rh$.

With this arrangement, it is now possible to start the motor under full field conditions while maintaining the slider C in the position corresponding to the preselected rated speed. In fact this may be achieved by merely opening switch $I_2$ and closing switch $I_1$. Then, if current is caused to flow in the L1—L2 supply, the maximum current passing through switch $I_1$ will flow through the motor field winding $m$. Thus, the motor will start under full field conditions. When it is desired to run the motor at its rated speed, it will be sufficient only to close switch $I_2$ and open switch $I_1$. Then the operating conditions will be substantially those described above with reference to Fig. 1. It will be noted that the provision of a unidirectional conducting element S will prevent the short-circuiting of the $a_1$—C portion of the resistor due to the possibly simultaneous closing of both switches $I_1$ and $I_2$.

Figure 4 illustrates a somewhat more complete diagram of an arrangement in which the means for ensuring predetermined minimum generator and motor excitations respectively when the slider is set at one end of its travel or at the other respectively are constituted by two resistors $Rg$ and $Rm$. These resistors determine the minimum excitation current in the generator winding $g$ and the motor winding $m$ respectively. These resistors have the same functions as the portions $a$—$a_1$ and $b$—$b_1$ of the resistor in Fig. 3. Thus, the travel of the slider C is reduced to a portion of the potentiometer $a$—$b$ and moreover the calibration of the device is facilitated. In Fig. 4, also are shown two other resistors $RTg$ and $RTm$ which determine the maximum excitation currents for the generator and the motor respectively.

It will be noted that when the slider C is positioned at the $a$ end of the resistor $Rh$, which corresponds to the minimum speed of the motor, the current flowing through switch $I_2$ and directed to the motor field winding $m$ will also flow through the unidirectional conducting element S. On the other hand, the current flowing through switch $I_1$ at the time of the starting with switch $I_1$ closed will directly reach the end $e$ of the motor field winding $m$. As the element S has a definite inherent resistance the result is that these two currents will have different values, which may impart to the motor a minimum speed having two different values, depending upon whether the switch used is $I_1$ or $I_2$.

This drawback can be overcome by interposing a resistor R in the circuit of switch $I_1$. The ohmic value of this resistor is determined in relation to that of the element S in order to obtain the same motor speed in the two aforementioned cases.

In most instances, and with a view to obtaining the maximum speed range available, switch $I_1$ will be kept closed during the starting periods which are the only intervals in which the motor operates under full field conditions. Thus, switch $I_1$ will be constantly open when switch $I_2$ is closed, and vice-versa.

It will be noted, however, that if switch $I_1$ is kept constantly closed, as well as switch $I_2$, it will be possible to modify the sensibility of speed variation since for the same total length of travel of the resistor slider there will be a smaller variation of speed, as there will be no simultaneous controlling action on both the generator and motor fields upon moving the slider, the motor operating constantly under full field conditions by virtue of switch $I_1$ being closed.

When, for example, the Leonard group is used for driving machine-tools operating according to a predetermined automatic cycle, it is most advantageous that the machines may have several rated speeds which are adjustable separately. For this purpose the resistor $Rh$ may be fitted with a plurality of sliders such as C2, C3 and C4, as shown in Fig. 7.

Since a certain period of time, even if of very short duration, is required to permit the opening or closing of switches such as $I_2$, $I_3$ and $I_4$, in order to prevent portions of the resistor (sometimes very large portions) from being short-circuited during the short intervals in which several of these switches would be closed simultaneously, the arrangement of Fig. 7 comprises the provision, in the connection of each switch, of a pair of unidirectional conducting elements, such as S2—S'2 for slider C2 for example, all these elements being disposed in the same direction with respect to the direct current supply L1—L2.

The switches $I_2$, $I_3$, $I_4$, are mechanically interconnected with switch $I_1$ so that closing of switch $I_1$ effects opening of all three switches $I_2$, $I_3$, $I_4$. The connection is such, however, that when switch $I_1$ is open the switches $I_2$, $I_3$, $I_4$ may be individually operated without operating switch $I_1$ to secure the different speeds determined by the setting of the sliders C2, C3, C4 as mentioned above. It will be apparent, however, that with such an arrangement even if several switches $I_2$, $I_3$ and $I_4$ are simultaneously in closed position the current cannot flow from one slider to the other outside the resistance wire of the resistor through the points $d_2$, $d_3$, $d_4$.

Of course, the invention is not restricted to the embodiments shown and described solely by way of examples in the specification and in the accompanying drawings. Thus, the resistor is assumed to be composed of resistance wire wound on an insulated tubular core, but it will be readily apparent to those skilled in the art that an arrangement wherein a resistor of any other description is used, such as a resistor having a movable contact arm carrying a contact stud adapted to engage frictionally and successively several fixed studs interconnected through suitable resistance elements, would still lie within the scope of the present invention.

What I claim is:

1. In a device for controlling the speed of the load motor of a Leonard group, the combination with a generator field winding, a motor field winding, a series connection between said field windings, two direct current supply wires respectively connected to the non-common terminals of said field windings, and a resistor connected across said two supply wires, of at least two taps on said resistor at points of different potential therealong, tap connections from said taps to said series connection, and at least one unidirectionally conductive device inserted in said series connection between said connections of said taps to said series connection in such direction that a flow of current is provided in said field windings from the plus supply wire to the minus supply wire, said connections of said taps to said series connection being so arranged with respect to the terminals of said unidirectionally conductive device that flow of current is prevented from a tap of higher potential to a tap of lower potential through said tap connections.

2. In a device for controlling the speed of the load motor of a Leonard group, the combination as defined in claim 1, in which the two supply lines respectively are connected to the non-common terminals of said field windings through resistances.

3. In a device for controlling the speed of the load motor of a Leonard group, the combination as defined in claim 1 in which switches are inserted in said tap connections.

4. In a device for controlling the speed of the load motor of a Leonard group, the combination as defined in claim 1 in which at least one of said taps is a movable tap constituted by a slider adapted to slide along said resistor in current carrying contact therewith.

5. In a device for controlling the speed of the load motor of a Leonard group, the combination with a generator field winding, a motor field winding, a series connection between said field windings, two direct current supply lines respectively connected to the non-common terminals of said field windings, a resistor connected across said two supply lines, a slider for said resistor movable therealong in current carrying contact therewith, and a slider connection between said slider and the terminal of said generator field winding connected to said series connection, of field current regulating means adapted to secure minimum values of the excitation current for the generator and motor field respectively when said slider is set at one end of its travel and at the other end thereof, a slider switch inserted in said slider connection, a full-field connection between the terminal of said motor field winding connected to said series connection and the end of said resistor corresponding to the extreme position of said slider securing the maximum motor field excitation, a full-field switch inserted in said full-field connection, and a unidirectionally conductive element inserted in said series connection between said series connected generator and motor field winding terminals in such direction that flow of current is provided in said field windings from the plus supply line to the minus supply line.

6. In a device for controlling the speed of the load motor of a Leonard group, the combination as defined in claim 5 in which a compensating resistance is inserted in said full-field connection, the ohmic value of said compensating resistance being dependent upon the ohmic value of said unidirectionally conductive element.

7. In a device for controlling the speed of the load motor of a Leonard group, the combination with generator and motor field windings, two direct current supply lines respectively connected to the non-common terminals of said field windings, a resistor connected across said two supply lines, and a plurality of taps on said resistor at points spaced therealong, of a plurality of connections in parallel with each other and as a group in series with and between said field windings, a tap on each of said parallel connections connected to said resistor taps respectively, two unidirectionally conductive elements inserted in each of said parallel connections at the respective sides of the tap on each connection, all said unidirectional elements being oriented in the same direction for flow of current therethrough in the direction of the current in said field windings, and a tap switch inserted in each of said tap connections.

8. In a device for controlling the speed of the load motor of a Leonard group, the combination as defined in claim 7 in which a full-field connection is provided between the terminal of said motor field winding connected to said series connections and the end of said resistor adapted to secure the maximum motor field excitation through said full-field connection, a full-field switch being inserted in said full-field connection.

9. In a device for controlling the speed of the load motor of a Leonard group, the combination as defined in claim 7 in which a full-field connection is provided between the terminal of said motor field winding connected to said series connections and the end of said resistor adapted to secure the maximum motor field excitation through said full-field connection, a full-field switch being inserted in said full-field connection, and interlocking means provided between said tap switches and said full-field switch to ensure closing of said tap switches when the full-field switch is open and vice versa.

10. In a device for controlling the speed of the load motor of a Leonard group, the combination as defined in claim 7 in which at least one of said resistor taps is constituted by a contact element supported for movement to different positions along said resistor for current carrying contact with said resistor in said positions.

11. In a device for controlling the speed of the load motor of a Leonard group, the combination with a generator field winding, a motor field winding, a series connection between said field windings, two direct current supply wires respectively connected to the non-common terminals of said field windings, and a resistor connected across said two supply wires, of at least two taps on said resistor at points of different potential therealong, tap connections from said taps to said series connection, at least one unidirectionally conductive device inserted in said series connection between said connections of said taps to said series connection in such direction that a flow of current is provided in said field windings from the plus supply wire to the minus supply wire, said connections of said taps to said series connection being so arranged with respect to the terminals of said unidirectionally conductive device that flow of current is prevented from a tap of higher potential to a tap of lower potential through said tap connections, and means carrying field excitation current for said generator and motor fields and connected in circuit with said field windings so as to cooperate with said windings to maintain minimum field excitations of said generator and said motor respectively when one of said taps is in a position adjacent one end of said resistor or in a position adjacent the other end thereof.

12. In a device for controlling the speed of the load motor of a Leonard group, the combination as defined in claim 11, in which said means carrying field excitation current is constituted by the end portions of said resistor, at least one of said taps on said resistor being provided by a slider movable along said resistor, abutments being provided in the proximity of the respective points of connection of said end portions to the main portion of said resistor for limiting the travel of said slider and preventing it from sliding over said end portions.

13. In a device for controlling the speed of the load motor of a Leonard group, the combination as defined in claim 11 in which a given one of said taps is provided at the end of said resistor corresponding to the maximum motor field excitation.

14. In a device for controlling the speed of the load motor of a Leonard group, the combination as defined in claim 11 in which a given one of said tap connections is connected to the end of said resistor corresponding to the maximum motor field excitation and is provided with a switch.

15. In a device for controlling the speed of the load motor of a Leonard group, the combination as defined in claim 11 which comprises only two taps and in which a given one of said taps is provided at the end of said resistor corresponding to the maximum motor field excitation and the other of said taps is a movable tap constituted by a slider adapted to slide along said resistor in current carrying contact therewith, a maximum field switch inserted in the tap connection from said given tap, a slider switch in said tap connection from said slider, and interlocking means cooperating with said switches to prevent their simultaneous closing.

16. In a device for controlling the speed of the load motor of a Leonard group, the combination as defined in claim 11 in which a given one of said taps is provided at the end of said resistor corresponding to the maximum motor field excitation, and a compensating resistance inserted in the tap connection from said given tap, the ohmic value of said compensating resistance being dependent upon the ohmic value of said unidirectionally conductive element.

17. In a device for controlling the speed of the load motor of a Leonard group, the combination with the generator field winding of said group and the motor field winding thereof connected in series with each other across a source of direct current supply, and a resistor connected across said supply in parallel with said series connected windings, of a unidirectionally conductive element connected in series with and between said windings in such direction that a flow of current is provided in said field windings from the plus terminal of said source of direct current supply to the minus terminal of said source, a contact element supported for movement to different positions along said resistor for current carrying contact with said resistor in said positions and connected to the terminal of said unidirectionally conductive element which is adjacent said generator field winding, and a tap on said resistor connected to the terminal of said unidirectionally conductive device which is adjacent said motor field winding, said contact element being adapted to slide between said tap and the end of said resistor which is connected to the non-common terminal of said motor field winding.

18. In a device for controlling the speed of the load motor of a Leonard group, the combination with the generator field winding of said group and the motor field winding thereof connected in series with each other across a source of direct current supply, and a resistor connected across said supply in parallel with said series connected windings, of a unidirectionally conductive element connected in series with and between said windings in the direction which provides flow of current in said field windings from the plus terminal of said source of direct current supply to the minus terminal of said source, of a connection from the terminal of said unidirectionally conductive element which is at higher potential to a tap on said resistor which is at a given potential thereon, and a connection from the terminal of said unidirectionally conductive device which is at lower potential to a tap on said resistor which is at a potential not less than the potential of said first tap.

CHARLES WILLIAM BERTHIEZ.

REFERENCES CITED

The following references are of record in the file of this patent:

UNITED STATES PATENTS

| Number | Name | Date |
|---|---|---|
| 516,804 | Fiske | Mar. 20, 1894 |
| 2,488,403 | Happel | Nov. 15, 1949 |

FOREIGN PATENTS

| Number | Country | Date |
|---|---|---|
| 466,266 | France | Feb. 25, 1914 |
| 652,928 | Germany | Nov. 10, 1937 |